United States Patent
Boegelein et al.

(10) Patent No.: US 8,281,900 B2
(45) Date of Patent: Oct. 9, 2012

(54) INDUSTRIAL TRUCK WITH ADJUSTABLE WHEEL AXLE

(75) Inventors: Rolf Boegelein, Crailsheim (DE); Oleg Plastinin, Landshut (DE); Henrik Schroeder, Winsen-Roydorf (DE); Ralf Werner, Landshut (DE); Christoph Zeidler, Landshut (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 915 days.

(21) Appl. No.: 11/865,190

(22) Filed: Oct. 1, 2007

(65) Prior Publication Data

US 2008/0078623 A1     Apr. 3, 2008

(30) Foreign Application Priority Data

Oct. 2, 2006  (DE) .................... 10 2006 046 858

(51) Int. Cl.
*B66F 9/06* (2006.01)
*B66F 9/16* (2006.01)
*B62D 49/08* (2006.01)
*B60G 17/0195* (2006.01)

(52) U.S. Cl. ......... 187/223; 187/222; 414/642; 280/755

(58) Field of Classification Search ............... 187/222, 187/234, 230; 414/444, 629, 631, 632, 634–636, 414/642; 280/755; *B66F 9/075, 9/06, 9/16; B62D 49/08*
See application file for complete search history.

(56) References Cited

U.S. PATENT DOCUMENTS

| | | | | |
|---|---|---|---|---|
| 4,279,319 A * | 7/1981 | Joyce, Jr. ..................... 180/12 |
| 4,340,235 A * | 7/1982 | Thompson ................. 280/6.159 |
| 4,393,959 A * | 7/1983 | Acker .......................... 187/226 |
| 5,639,119 A * | 6/1997 | Plate et al. .................... 280/754 |
| 5,682,980 A * | 11/1997 | Reybrouck ................. 280/5.504 |
| 5,947,516 A * | 9/1999 | Ishikawa ...................... 280/755 |
| 5,984,322 A * | 11/1999 | Lee ............................ 280/6.159 |
| 6,082,742 A * | 7/2000 | Ishikawa ................... 280/5.508 |
| 6,131,918 A * | 10/2000 | Chino ........................ 280/6.154 |
| 6,175,796 B1 * | 1/2001 | Ishikawa ........................ 701/50 |
| 6,308,973 B1 * | 10/2001 | Griebel et al. .......... 280/124.159 |
| 6,611,746 B1 * | 8/2003 | Nagai ............................. 701/50 |
| 6,641,152 B1 * | 11/2003 | Suzuki ................... 280/124.112 |
| 6,719,098 B1 * | 4/2004 | Ishikawa et al. .............. 187/222 |

FOREIGN PATENT DOCUMENTS

EP           1 223 280 A       2/1971

* cited by examiner

*Primary Examiner* — Emmanuel M Marcelo
*Assistant Examiner* — Stefan Kruer
(74) *Attorney, Agent, or Firm* — Rothwell, Figg, Ernst & Manbeck, P.C.

(57) ABSTRACT

In an industrial truck, in particular a fork-lift truck, having a vehicle frame and a load pickup means (16), which can be displaced in relation to the vehicle frame, at least one wheel which is closer to the load pickup means and, at a distance from this, at least one wheel (20) which is further away from the load pickup means being provided on the vehicle frame, the wheel axle (18) of at least one wheel (20) being capable of moving in relation to the vehicle frame along a movement trajectory with a movement component which is orthogonal with respect to the standing area of the industrial truck, in addition a loading force (B), which is caused by the tare weight of the industrial truck and a load (L) which may have been picked up by said industrial truck, acting on the at least one moveable wheel axle (18), which loading force changes operationally, the at least one moveable wheel axle (18) in addition has or can have an arbitrarily variable additional force applied to it.

26 Claims, 2 Drawing Sheets

INDUSTRIAL TRUCK WITH ADJUSTABLE WHEEL AXLE

The present application relates to an industrial truck, in particular a fork-lift truck, in accordance with the precharacterizing clause of claim 1. Such an industrial truck comprises, inter alia, a vehicle frame and a load pickup means, which can be displaced in relation to the vehicle frame, at least one wheel which is closer to the load pickup means and, at a distance from this, at least one wheel which is further away from the load pickup means being provided on the vehicle frame, the wheel axle of at least one wheel being capable of moving in relation to the vehicle frame along a movement trajectory with a movement component which is orthogonal with respect to the standing area of the industrial truck, in addition a loading force, which is caused by the tare weight of the industrial truck and a load which may have been picked up by said industrial truck, acting on the at least one moveable wheel axle, which loading force changes operationally. The at least one moveable wheel axle in addition has or can have a variable additional force applied to it.

As is conventional in most industrial trucks, at least one selectively controllable load force device which is connected in terms of force transfer to the load pickup means is provided in order to displace the load pickup means in relation to the vehicle frame.

In order to set the level of the vehicle frame with respect to the standing areas in a simple and targeted manner, the known industrial truck has an adjusting device, which is connected to the at least one moveable wheel axle and by means of which the moveable wheel axle is adjustable in relation to the vehicle frame along an adjustment trajectory with an adjustment component which is orthogonal with respect to the standing areas of the industrial truck. In this case, a desired level of the vehicle frame can be set in a simple manner since the variable additional force is the actuating force required for adjusting the moveable and adjustable wheel axle.

An industrial truck of the generic type has been disclosed in the form of a fork-lift truck in DE 197 32 400 A1. The fork-lift truck disclosed therein has a front axle (wheel axle which is closer to the load pickup means) provided rigidly on the vehicle frame and a rear axle (wheel axle which is further away from the load pickup means) which is capable of moving in relation to the vehicle frame. The rear axle is connected to the vehicle frame in such a way that it can be adjusted via a piston/cylinder arrangement. An angle of inclination sensor detects an inclination of the vehicle frame, for example owing to a load being picked up, set down or displaced by means of a fork provided as the load pickup means. The angle of inclination sensor, depending on the detected inclination of the vehicle frame, transmits signals to a controller of an electric motor, which drives a hydraulic pump and therefore generates the hydraulic pressure for the piston/cylinder arrangement displacing the rear axle.

In the case of industrial trucks of the type mentioned at the outset, it is important to ensure that, irrespective of the loading state of the industrial truck, the vehicle frame is located at a desired level with respect to the standing area.

"Standing area" denotes an area on which the wheels of the industrial truck are standing on the floor.

It may arise for example, when the wheel axle which is further away from the load pickup means is the moveable wheel axle, that, when a load is picked up on the load pickup means as a possibility for an operational change in the loading force, the wheel axle which is further away from the load pickup means is relieved of load to such an extent that an undesired relative movement between the vehicle frame and the wheel axle which is further away from the load pickup means results.

Furthermore, when traveling on sloping planes without a displacement of the moveable wheel axle in relation to the vehicle frame, the vehicle frame may be so severely inclined with respect to the horizontal that, under certain circumstances, load displacement operations need to be implemented, which is undesirable, in order to be able to ensure safe load conveyance.

In contrast to the solution known from the prior art, in which a separate angle of inclination sensor is used for regulating the level of the vehicle frame and therefore of the industrial truck, an object of the present invention is to propose an industrial truck which makes it possible in an efficient manner for the vehicle frame to be located at a desired position level with respect to the standing area of the industrial truck.

This object is achieved according to the invention by virtue of the fact that, in order to suppress an undesired relative movement between the at least one moveable axle and the vehicle frame, the additional force can be changed according to the force output by the load force device.

The force output by the load force device is used as an orientation variable for the change in the additional force:

The size of the picked-up load and the location at which it is positioned in relation to the vehicle frame are important, besides the tare weight of the vehicle, for the loading force acting on at least one moveable wheel axle.

The force output by such a load force device has a direct relationship with the load accommodated on the load pickup means. Therefore, the force output by the load force device is indirectly a measure of the loading force acting on the at least one moveable wheel axle. By changing the additional force according to the force output by a load force device, the additional force can therefore be changed indirectly according to the loading force with a degree of accuracy which is sufficient for industrial trucks, without the loading force needing to be determined by a complex sensor system.

Where it is stated that, in order to regulate the level of the vehicle frame, the moveable wheel axle has or can have an additional force applied to it, this means that the additional force is either always effective or can be exerted if desired on the wheel axle. In both cases, however, the additional force can be changed in terms of its direction of action and/or (and this is preferred) in terms of its value.

Where it is stated above that the loading force acting on the moveable wheel axle is caused by the tare weight of the industrial truck and a load which may have been picked up, this should not exclude the fact that, in addition, it is also possible for other forces to act on the wheel axles. Such other forces will not be considered, however, apart from the additional force.

"Movement trajectory" refers to the geometric path along which the at least one moveable wheel axle is capable of moving in relation to the vehicle frame. This trajectory is formed by the geometric location of all possible axle positions. When the at least one moveable wheel axle is articulated on the vehicle frame by means of a rocker, for example, then the movement trajectory, when viewed in the axial direction, is a curved line. If the at least one adjustable wheel axle is provided such that it is translatorially adjustable on the vehicle frame, as described on the other hand, in EP 465 838 A1, the adjustment trajectory, when viewed in the direction of the wheel axle, is a straight line.

In order to increase the driving comfort of the industrial truck, the adjustable axle of the industrial truck may be a spring-loaded wheel axle. As such, it is connected to the vehicle frame with a spring arrangement. It is then advantageous, for reasons of a low number of component parts, if the adjusting device comprises the spring arrangement. The spring-loadability can be switched off, with the result that, in certain operating situations, the industrial truck can be operated without any spring-loading.

The moveability of the at least one moveable wheel axle can be designed in such a way that it is selectively blockable, with the result that, in certain operating situations, for example when stacking and/or unstacking and/or at a slow speed, it can be fixed in its position in relation to the vehicle frame.

In principle, the adjusting device may be any desired electrical, electromechanical, electromagnetic etc. adjusting device. Preferably, the adjusting device is fluidically operated, however, since a pneumatic cycle and/or a hydraulic cycle is in any case provided in numerous industrial trucks. In addition, the abovementioned spring arrangement can be realized particularly easily with a fluidically operated adjusting device. The spring-loadability can then be switched off easily by valves, for example check valves.

In this case, a fluid is any desired suitable free-flowing material, in particular a gas or a liquid, for example a hydraulic oil.

In design terms, the adjusting device may comprise a piston/cylinder arrangement, one component part comprising the piston and the cylinder being connected to the vehicle frame, and the respective other component part being connected to the adjustable wheel axle, having a first pressure chamber, which is formed by the cylinder and a first piston face of the piston and is or can be connected in terms of fluid transfer to a first pressure accumulator.

In this solution, the loading force acting on the adjustable wheel axle will also act on the piston/cylinder arrangement, with the result that a relative position of the piston and cylinder is set depending on the pressure in the first pressure accumulator, in which position an equilibrium of forces prevails at the piston/cylinder arrangement.

If, starting from a state of equilibrium which has once been achieved, the loading force changes because either a load is picked up by the industrial truck or a picked-up load is raised and/or inclined or a picked-up load is set down, if no further measures are taken the piston will be adjusted in relation to the cylinder until a state of equilibrium is again achieved at the piston/cylinder arrangement ("rebound" or "compression"of the moveable wheel axle). However, in this case the level of the vehicle frame in relation to the vehicle standing area would change in an undesirable manner.

In accordance with an embodiment of the present invention, this can be counteracted by virtue of the fact that the pressure in the first pressure accumulator can be changed according to the force output by the load force device. The pressure acting on the piston face of the first pressure chamber then generates the additional force.

If, for example, the piston/cylinder arrangement of a moveable wheel axle which is further away from the load pickup means is relieved of load, for example by means of a load being picked up, the pressure in the first pressure accumulator can be reduced according to a load force device, which is connected in terms of force transfer to the load pickup means, in such a way that a relative movement of the piston and cylinder is prevented or at least reduced, with the result that the undesired relative movement between the wheel axle and the vehicle frame does not arise or only arises to a small extent. As a result, the level of the vehicle frame in relation to the standing area of the industrial truck can be kept substantially constant.

In accordance with a further possible and, owing to the simple operation, preferred embodiment of the present invention, the piston/cylinder arrangement may be a double-action piston/cylinder arrangement, in which a second pressure chamber, which is formed by the cylinder and a second piston face, which is opposite the first piston face, of the piston, is or can be connected in terms of fluid transfer to a second pressure accumulator, which is formed separately from the first pressure accumulator. In this case, in addition or as an alternative to the above-described possibility of changing the pressure in the first pressure chamber, the connected fluid cycle can be designed such that the pressure in the second pressure chamber can be changed according to the force output by the load force device. The additional force is then generated by the pressure exerted on the respective piston faces.

In order to keep to the above-described example of the wheel axle being relieved of load, in this case the pressure in the second pressure chamber can be increased according to the force output by the load force device, with the result that, in turn, an undesired adjustment of the wheel axle in relation to the industrial truck can be substantially avoided.

By increasing or reducing the pressure in the respective pressure chambers of the piston/cylinder arrangement by means of the adjustment force device, in addition or as an alternative a desired inclination of the industrial truck in relation to the standing area of the industrial truck can be set.

An undesired relative movement between the at least one moveable wheel axle and the vehicle frame of the industrial truck can be suppressed at least when the value of the loading force is in a predetermined force range by virtue of the fact that the industrial truck has a control apparatus, which is designed to change the additional force in such a way that it becomes higher in value if the loading force becomes lower in value, and vice versa. Owing to the control apparatus designed in such a way, it is possible to ensure that a sum of the loading force and the additional force acting on the wheel axle is substantially constant, with the result that, irrespective of the actual load accommodating situation of the industrial truck, the moveable wheel axle is loaded substantially constantly.

Where it is stated above that the position of the adjustable wheel axle with respect to the vehicle frame is "substantially" constant, this is not intended to mean a strict constancy. In fact, during operation of an industrial truck according to the invention, furthermore slight adjustment movements of the moveable and adjustable wheel axle in relation to the vehicle frame are implemented already as a result of the dynamically changing force relationships, but the movement path however is considerably reduced by the configuration according to the invention of the industrial truck.

It is advantageous if the controllable load force device is a fluidically actuated load force device. In this case, the working fluid pressure of the load force device is a control variable which is proportional to the force output by the load force device and according to which the additional force can be changed.

Particularly advantageously, the controllable load force device is in the form of a fluidically actuated load force device when the adjusting device is also fluidically operated. In this case it is particularly preferred that the adjusting device and the load force device can be actuated by the same fluid, with the result that the two force devices can be supplied by a common fluid reservoir.

Likewise preferably, the adjustment force device comprises a fluid delivery pump, with which fluid can be delivered into a pressure chamber of the adjusting device. In this case, in turn the number of required components can be kept low if the adjusting device and the controllable load force device are connected to a common fluid delivery pump for working fluid transfer.

Then, in addition, it is possible in a particularly simple manner in design terms to provide an implementation in which the fluid pressure in the first pressure chamber and/or the fluid pressure in the second pressure chamber can be changed according to the working fluid pressure of the load force device.

This can take place by means of corresponding pressure influencing means which are known per se and which are operated according to the working fluid pressure of the force device and act on the pressure of the first and/or second pressure accumulator.

In a particularly simple manner, the fluid pressure in the first and/or the second pressure chamber can be changed by the working fluid pressure of the load force device if the working fluid pressure of the load force device is or can be applied to the first and/or the second pressure chamber. Since the pressure in the first and/or in the second pressure chamber under certain circumstances is intended to be changed with a certain, possibly nonlinear, relationship with respect to the working fluid pressure of the load force device, a pressure-changing apparatus can be interposed which changes the working fluid pressure of the load force device to the pressure respectively desired in the first and/or in the second pressure chamber.

Since it may be desirable for the fluid pressure in the first pressure chamber of the piston/cylinder arrangement to be reduced if the working fluid pressure of the load force device increases, provision may be made for the working fluid pressure of the load force device to actuate an apparatus which reduces the pressure in the first pressure chamber in accordance with a predetermined, possibly also nonlinear, relationship with the working fluid pressure.

The abovementioned exemplary embodiments can particularly advantageously be applied for the more common case of a moveable and adjustable wheel axle which is further away from the load pickup means. As the load increases, a tipping moment about the wheel axle which is closer to the load pickup means acts on the industrial truck, and this tipping moment relieves the wheel axle which is further away from the load pickup means of load when the wheel axle which is closer to the load pickup means is located between the load and the wheel axle which is further away from the load pickup means. Since, often, the force device which is connected in terms of force transfer to the load pickup means outputs a force which changes in the same direction as the picked-up load, i.e. increases as the load increases and decreases as the load decreases, the force output by the load force device for moveable wheel axles which are further away from the load pickup means changes in opposition to the loading force acting on the moveable wheel axle which is further away from the load pickup means, i.e. the force output by the load force device increases when the loading force decreases, and vice versa. The force output by the load force device advantageously changes in the same direction as the desired pressure, which is required for compensating for the change in loading force, in the above-described second pressure chamber, however.

This should expressly not rule out the fact that the wheel axle of the industrial truck which is closer to the load pickup means is also designed to be moveable and adjustable, even though this is not preferred for reasons of the dynamics of movement of industrial trucks.

As is known per se, the industrial truck may have a mast, which can be inclined in relation to the vehicle frame and on which the load pickup means is accommodated. Preferably, an inclined movement force device, which drives the mast so as to carry out an inclined movement, can then be used as the controllable load force device, since the force output by such an inclined movement force device is proportional to the torque acting on the industrial truck about the wheel axle which is closer to the load pickup means. As has been described above, this makes it possible in a particularly simple manner for an undesired relative movement between the moveable wheel axle which is further away from the load pickup means and the vehicle frame of an industrial truck to be suppressed.

As an alternative or in addition, however, it is also conceivable to use a linear movement force device, which drives the load pickup means so as to carry out a linear movement, as the controllable load force device, according to which the additional force can be changed.

Although the force output by the linear movement force device is generally only proportional to the weight of the picked-up load, but not to the tipping moment acting on the industrial truck about the wheel axle which is closer to the load pickup means, this force can also be used for suppressing an undesired relative movement between the moveable wheel axle which is further away from the load pickup means and the vehicle frame. As a result of the relationship between the output force of the load force device and the loading force acting on that wheel axle of the industrial truck which is further away from the load pickup means, which relationship is less direct in comparison with the inclined movement force device, when using the linear movement force device as the controllable load force device, according to which the additional force acting on the moveable wheel axle can be changed, the abovementioned pressure-changing apparatus can be provided.

The present invention will be explained in more detail below with reference to the attached figures, in which.

Figure 1:
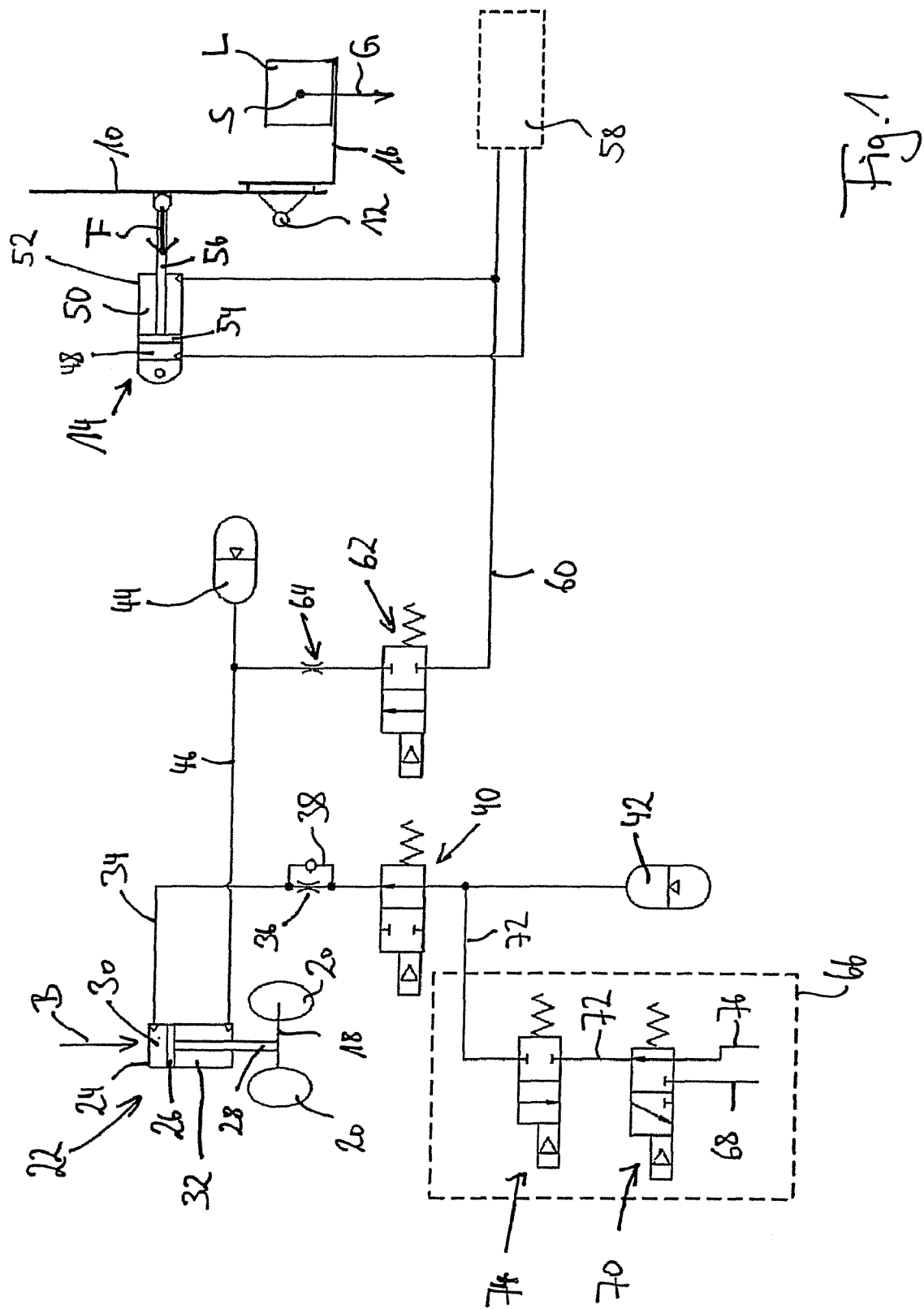
FIG. 1 shows a first embodiment of the present invention.

FIG. 1 illustrates schematically a level regulation apparatus of an industrial truck. It shows a mast 10, which can be inclined about an axis of inclination 12 by means of a double-action hydraulic piston/cylinder arrangement 14.

On the mast 10, a fork 16 can be raised and lowered along the mast 10 by means of a hydraulic piston/cylinder arrangement (not illustrated in FIG. 1).

FIG. 1 furthermore shows a wheel axle 18, which is preferably a wheel axle which is further away from the load pickup means, but may also be a wheel axle of the industrial truck which is closer to the load pickup means.

In the example shown, the wheel axle 18 bears two wheels 20, but it may also bear only one wheel or more than two wheels.

The wheel axle 18 is accommodated by a hydraulic piston/cylinder arrangement 22, whose cylinder 24 is fixed on the vehicle frame and whose system comprising the piston 26 and, connected rigidly to this, the piston rod 28 is connected to the wheel axle 18. The piston rod 28 is oriented substantially orthogonally with respect to the standing area. The wheel axle 18 is therefore capable of moving in relation to the vehicle frame substantially orthogonally with respect to the standing area (not shown) of the industrial truck. The hydraulic piston/cylinder arrangement 22 can be accommodated in any desired orientation on the vehicle frame as long as a corresponding configuration of the accommodation of the wheel axle or an intermediate arrangement of a force deflection device ensures that actuation of the arrangement 22 can result in a movement of the wheel axle 18 with the movement component orthogonal with respect to the standing area.

The hydraulic piston/cylinder arrangement 22 is a double-action hydraulic piston/cylinder arrangement having a first pressure chamber 30 and a second pressure chamber 32, which is separated from said first pressure chamber by the piston 26.

The first pressure chamber 30 is connected to a first pressure accumulator 42 via a hydraulic line 34, in which a throttle 36 and, parallel to this, a nonreturn valve 38 as well as a switchable valve 40 are provided. The throttle 36 may be a throttle which can be set variably and with which different damping characteristics can be obtained. The throttle 36 may also be in the form of a throttle which can be regulated actively as a function of vehicle operating states, with the result that, depending on the operating state of the vehicle (for example vehicle speed and/or picked-up load), a desired damping characteristic is automatically set.

As an alternative or in addition, the throttle opening can be regulated depending on the position and/or the speed and movement direction of the piston 26 in relation to the cylinder 24. It is thus advantageous for convenient isolation of oscillations if the opening of the throttle 36 is reduced in size as the piston 26 approaches one of its end positions to an increasing extent. In a central position region of the piston 26 in the cylinder 24, the throttle 36 may be completely open.

The switchable valve 40 is prestressed in the passage position, in which the first pressure accumulator 42 is connected fluidically to the first pressure chamber 30, and can be brought, by a control apparatus, into a blocking position in which the first pressure accumulator 42 is separated from the first pressure chamber 30. As a result, the hydraulic spring-loading of the wheel axle 18, which is provided by the pressure accumulator 42 and the first pressure chamber 30, can be blocked, with the result that the rear axle 18 is fixed substantially rigidly with respect to the cylinder 24 and therefore the vehicle frame.

It should be added that the nonreturn valve 38 allows passage in the direction from the first pressure accumulator 42 towards the first pressure chamber 30 and blocks in the opposite direction.

The second pressure chamber 32 of the hydraulic piston/cylinder arrangement 22 is connected to a second pressure accumulator 44 via a hydraulic line 46.

If a load L is accommodated on the fork 16, the weight G of the load L acts in the direction of action of the force of gravity passing through the center of gravity S of the load L. This brings about a torque about the axis of inclination 12 of the mast 10. This torque is counteracted by a force F which is output by the hydraulic piston/cylinder arrangement 14 and likewise brings about a torque about the axis of inclination 12. In the state of equilibrium, the torques acting about the axis of inclination 12 are equal in size, the forces G and F having a response which is inversely proportional to their associated load arms.

The hydraulic piston/cylinder arrangement 14 has a double action and comprises a first working area 48 and a second working area 50. The working areas 48 and 50 in the cylinder 52 are separated by the piston 54, which is connected to the mast 10 by the piston rod 56.

An inclination controller 58 is now designed in such a way that it can deliver hydraulic liquid in a targeted manner into the first working area 48 and into the second working area 50, it being sufficient in the arrangement illustrated for equilibrium of the torques about the axis of inclination 12 to ensure a desired fluid pressure in the second working area 50, while the first working area 48 can remain substantially unpressurized. There is therefore a direct relationship between the torque about the axis of inclination 12 which is caused by the weight G of the load L and the pressure of the hydraulic liquid prevailing in the second working area 50.

Therefore, the hydraulic liquid pressure prevailing in the second working area 50 can be applied to the line 46 and therefore to the second pressure chamber 32 by means of the line 60 via a switchable valve 62 and a throttle 64. During a flow movement of the hydraulic liquid, the throttle ensures a pressure reduction.

The switchable valve 62 is prestressed in a blocking position and can be adjusted by a control apparatus into a passage position. In this passage position of the valve 62, the pressure of the second working area 50 acts on the second pressure chamber 32 of the hydraulic piston/cylinder arrangement 22, by means of which the wheel axle 18 is connected to the vehicle frame.

In the example shown in FIG. 1, the wheel axle 18 is a wheel axle which is further away from the load pickup means. When the load L is picked up by the fork 16, the loading force, which acts on the rear axle 18 as a result of the tare weight of the industrial truck and the weight G of the picked-up load, is reduced owing to the tipping moment about the front axle of the industrial truck which is caused by the load L and its weight G. Since the first pressure accumulator 42 in a predetermined position of the piston 26 provides a substantially constant hydraulic liquid pressure, the reduction of the loading force B without any further measures results in the piston 26 and the piston rod 28 being pushed out of the cylinder 24.

Since, however, in the exemplary embodiment shown in FIG. 1, when the load L is picked up on the fork 16, the pressure in the second working area 50 of the hydraulic piston/cylinder arrangement 14 is also increased and the second working area 50 communicates with the second pressure chamber 32 via the lines 46 and 60, at the same time as the reduction in the loading force B the pressure in the second pressure chamber 32 rises, with the result that the reduction in the loading force B is compensated for by the increased hydraulic pressure acting on the piston 26 in the second pressure chamber 32 and the resultant additional force. Although the rear axle 18 is therefore hydraulically spring-loaded, a load L being picked up therefore does not result in an undesired change in position of the vehicle frame in relation to the standing area, with the result that, while retaining the spring-loading of the rear axle 18, the level of the vehicle frame in relation to the standing area of the industrial truck can be kept substantially constant.

FIG. 1 also shows an additional device 66, with which hydraulic fluid can be delivered in a targeted manner into the first pressure chamber 30. For this purpose, a delivery line 68 is provided which is connected to a fluid delivery pump (not illustrated). This fluid delivery pump may be the same as the one which also delivers hydraulic liquid to the hydraulic piston/cylinder arrangement 14.

The delivery line 68 can be connected to the line section 72 via a first control valve 70, counter to a spring prestress of said control valve 70.

Furthermore, a second control valve 74 is provided, with which the line section 72 can be blocked or made to allow the passage of fluid. The second control valve 74 is prestressed in a blocking position which interrupts the line section 72 and can be adjusted into the passage position counter to the force of the spring prestress.

When the second control valve 74 is located in the passage position and the first control valve 70 connects the delivery line 68 to the line section 72, hydraulic liquid can be delivered via the delivery line 68, the line section 72, the switchable valve 40, the throttle 36 and the nonreturn valve 38 and the line 34 into the first pressure chamber 30 of the hydraulic piston/cylinder arrangement 22 in order to push the piston rod 28 out of the cylinder 24.

The additional device 66 furthermore comprises a drain line 76, which passes to a hydraulic liquid reservoir (not illustrated).

If the first control valve 70 is located in the drain position, in which it is prestressed and in which it connects the drain line 76 to the line section 72, when the second control valve 74 is adjusted into its passage position, hydraulic liquid can be drained out of the first pressure chamber 30 into the hydraulic liquid reservoir via the line 34, the throttle 36, the check valve 40, the line section 72 and the drain line 76. As a result, the piston rod 78 is moved into the cylinder 24.

The additional device 66 can therefore serve the purpose of setting the level of the vehicle frame in relation to the wheel axle 18 or in relation to a plurality of wheel axles in a targeted manner.

Furthermore, by means of the additional device 66, hydraulic liquid in the pressure accumulator 42 can be added to if said hydraulic liquid were to have emerged from the line system or from the pressure accumulator 42 owing to a leak.

Figure 2:
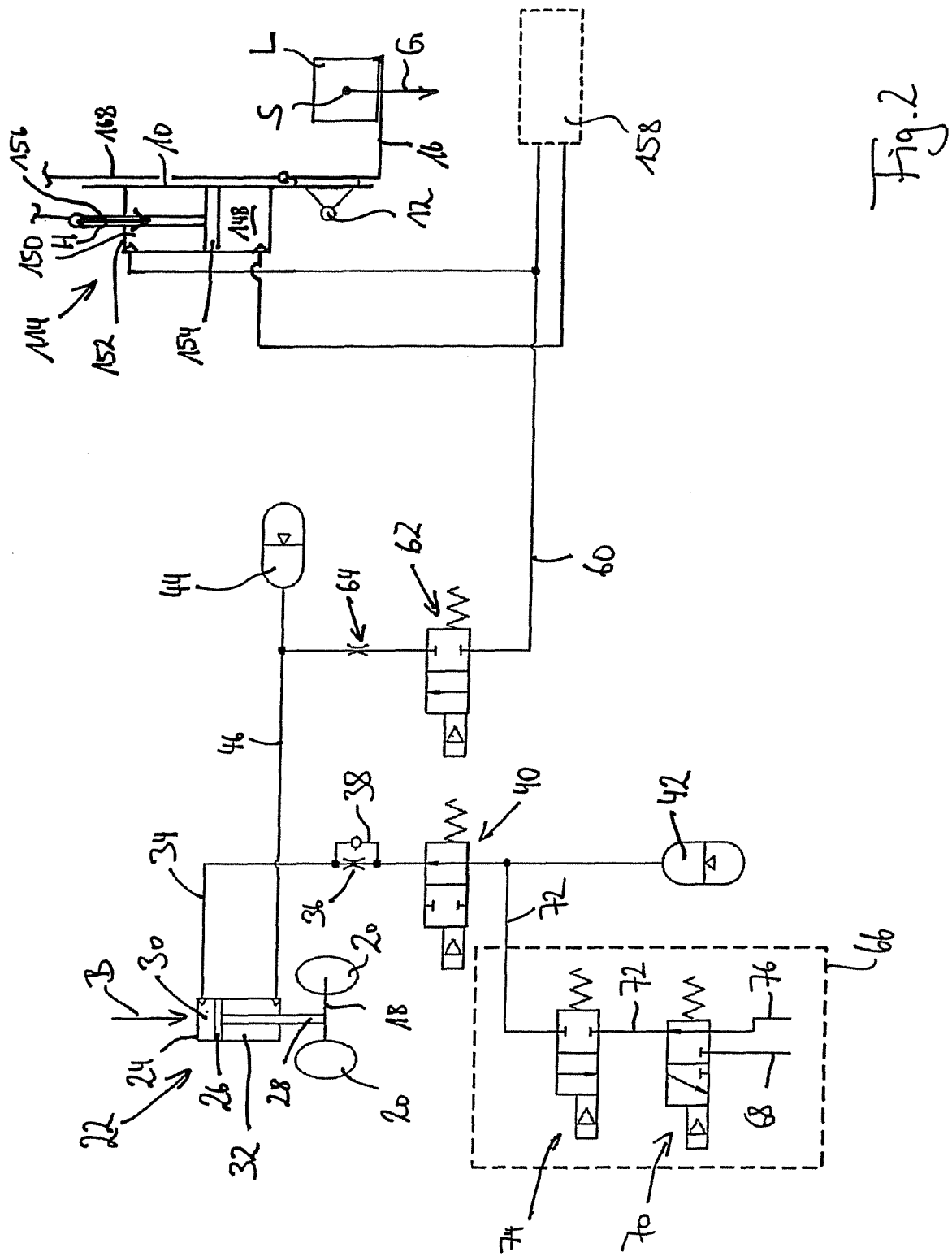
FIG. 2 shows a second embodiment of the present invention.

The second embodiment shown in FIG. 2 substantially corresponds to that shown in FIG. 1. A hydraulic piston/cylinder arrangement 114, which raises and lowers the fork 16 along the mast 10 and which can likewise be used to connect a working area to the second pressure chamber 32 in terms of pressure transfer, is merely shown instead of a hydraulic piston/cylinder arrangement which brings about an adjustment to the inclination of the mast 10.

In FIG. 2, the hydraulic piston/cylinder arrangement 114, which is provided for the purpose of raising and lowering the fork 16 in relation to the mast 10, has been provided with the same reference numerals as the hydraulic piston/cylinder arrangement 14, which is illustrated in FIG. 1 and is intended to incline the mast 10, but increased by the number 100.

The piston rod 156 is connected to the fork 16 via a chain pull 168, with the result that the fork 16 is raised when the piston 154 is lowered in the cylinder 152, and vice versa. The weight of the fork 16 and the weight G of the load L is kept in equilibrium by the pressure in the second working area 150. For this reason, the pressure of this second working area 150 is or can be connected to the second pressure chamber 32.

Owing to the cable pull 168, a lifting force H acts on the piston rod 156, and this lifting force is proportional to the sum of the weight G of the load L and the tare weight of the fork 16, but not to the tipping moment about the axis of inclination 12. Since, however, the relationship between the load arms of the forces acting on the fork side and on the side of the piston/cylinder arrangement owing to the predetermined geometries and the possible load dimensions fluctuates within narrow limits, the force H acting on the piston rod can be regarded as being quasi-proportional to the tipping moment about the axis of inclination 12 or about the front axle of the industrial truck. By suitably selecting the throttle 64, the value of the hydraulic liquid pressure prevailing in the second working area can be set to an advantageous value for the second pressure chamber 32, with the result that, when a load L is picked up or set down on or by the fork 16, the relative position of the piston 26 with respect to the cylinder 24 does not change or only changes to a very small extent.

The invention claimed is:

1. An industrial truck comprising:
   a vehicle frame;
   a load pickup, which can be displaced in relation to the vehicle frame;
   a front wheel axle;
   a moveable wheel axle a distance from the front wheel axle, wherein the moveable wheel axle is further away from the load pickup than the front wheel axle and is capable of moving in relation to the vehicle frame;
   a selectively controllable load force device connected in terms of force transfer to the load pickup and provided so as to displace the load pickup in relation to the vehicle frame;
   an adjusting device connected to the moveable wheel axle and configured to adjust the moveable wheel axle in relation to the vehicle frame along an adjustment trajectory with an adjustment component that is orthogonal with respect to a standing area of the industrial truck;
   wherein a loading force, which is caused by a tare weight of the industrial truck and any load picked up by said industrial truck, acts on the moveable wheel axle, and the loading force changes while said industrial truck is in operation;
   wherein an additional force, which is in addition to the loading force and is an actuating force required for adjusting the moveable wheel axle, is changed according to a force output by the load force device;
   wherein the adjusting device comprises a first pressure chamber having a pressure that is changed according to the force output by the load force device; and
   wherein the load force device communicates with the first pressure chamber.

2. The industrial truck as claimed in claim 1, wherein the adjusting device is a fluidically operated adjusting device.

3. The industrial truck as claimed in claim 2, wherein the adjusting device comprises a piston/cylinder arrangement comprising:
   a piston;
   a cylinder connected to the vehicle frame;
   a piston rod connected to the moveable and moveable wheel axle; and
   the first pressure chamber, wherein the first pressure chamber is formed by the cylinder and a first piston face of the piston and connected in terms of fluid transfer to a first pressure accumulator.

4. The industrial truck as claimed in claim 3, wherein the piston/cylinder arrangement is a double-action piston/cylinder arrangement that additionally comprises:
   a second pressure chamber formed by the cylinder and a second piston face, which is opposite the first piston face, of the piston and connected in terms of fluid transfer to a second pressure accumulator formed separately from the first pressure accumulator.

5. The industrial truck as claimed in claim 4, wherein the adjusting device is configured to change the pressure in the first pressure chamber and/or the pressure in the second pressure chamber according to the force output by the load force device.

6. The industrial truck as claimed in claim 5, wherein the load force device is a fluidically actuated load force device and the pressure of the first pressure accumulator and/or the pressure of the second pressure accumulator is changed according to the working fluid pressure of the load force device.

7. The industrial truck as claimed in claim 6, wherein the working fluid pressure of the load force device is applied to the first and/or to the second pressure accumulator.

8. The industrial truck as claimed in claim 5, wherein the load force device is a fluidically actuated load force device, wherein the additional force changes according to a working fluid pressure of the load force device, and the working fluid pressure of the load force device is applied to the first and/or to the second pressure chamber.

9. The industrial truck as claimed in claim 8, further comprising a pressure-changing apparatus interposed between the adjusting device and the load force device.

10. The industrial truck as claimed in claim 4, wherein the adjusting device comprises a spring arrangement, with which the moveable wheel axle, which is in the form of a spring-loaded wheel axle, is connected to the vehicle frame.

11. The industrial truck as claimed in claim 1, wherein the load force device is a fluidically actuated load force device and the additional force changes according to a working fluid pressure of the load force device.

12. The industrial truck as claimed in claim 11, wherein the load force device is a hydraulic piston/cylinder arrangement.

13. The industrial truck as claimed in claim 1, wherein the adjusting device is a fluidically operated adjusting device, and the controllable load force device comprises a fluid delivery pump.

14. The industrial truck as claimed in claim 13, wherein the adjusting device and the controllable load force device are connected in terms of working fluid transfer to a common fluid delivery pump.

15. The industrial truck as claimed in claim 1, wherein the moveable wheel axle is hydraulically spring-loaded and the pressure of the first pressure chamber is changed while retaining the spring-loading of the moveable wheel axle.

16. The industrial truck as claimed in claim 15, wherein the pressure of the first pressure chamber is changed according to the force output by the load force device such that a reduction in the loading force is compensated for by an increase of hydraulic pressure in the first pressure chamber.

17. The industrial truck as claimed in claim 1, further comprising a controllable adjustment force device that interacts with the adjusting device and is configured to be selectively set up.

18. The industrial truck as claimed in claim 1, wherein the adjusting device comprises a spring arrangement that connects the moveable wheel axle, which is in the form of a spring-loaded wheel axle, to the vehicle frame.

19. The industrial truck as claimed in claim 1, further comprising a control apparatus configured to change the additional force at least when the value of the loading force is in a predetermined force range in such a way that a component of the additional force acting in the direction of the adjustment trajectory becomes higher in value if the loading force becomes lower, and vice versa.

20. The industrial truck as claimed in claim 1, further comprising a mast inclined in relation to the vehicle frame and on which the load pickup is accommodated, and
wherein the controllable load force device is an inclined movement force device that drives the mast so as to carry out an inclined movement.

21. The industrial truck as claimed in claim 1, wherein the load pickup can be raised and lowered in relation to the vehicle frame, and the industrial truck has a lifting movement force device, which drives the load pickup so as to carry out a lifting movement, as the controllable load force device.

22. The industrial truck as claimed in claim 1, wherein the moveable wheel axle is fixable in a position in relation to the vehicle frame.

23. The industrial truck as claimed in claim 1, wherein the pressure of the first pressure chamber is changed according to the force output by the load force device such that a reduction in the loading force is compensated for by an increase of hydraulic pressure in the first pressure chamber.

24. An industrial truck comprising:
a vehicle frame;
a load pickup, which can be displaced in relation to the vehicle frame;
a front wheel axle;
a moveable wheel axle a distance from the front wheel axle, wherein the moveable wheel axle is further away from the load pickup than the front wheel axle and is capable of moving in relation to the vehicle frame;
a selectively controllable load force device connected in terms of force transfer to the load pickup and provided so as to displace the load pickup in relation to the vehicle frame;
an adjusting device connected to the moveable wheel axle and configured to adjust the moveable wheel axle in relation to the vehicle frame along an adjustment trajectory with an adjustment component that is orthogonal with respect to a standing area of the industrial truck;
wherein a loading force, which is caused by a tare weight of the industrial truck and any load picked up by said industrial truck, acts on the moveable wheel axle, and the loading force changes while said industrial truck is in operation;
wherein an additional force, which is in addition to the loading force and is an actuating force required for adjusting the moveable wheel axle, is changed according to a force output by the load force device;
wherein the adjusting device comprises a first pressure chamber having a pressure that is changed according to the force output by the load force device; and
wherein the moveable wheel axle is hydraulically spring-loaded and the pressure of the first pressure chamber is changed while retaining the spring-loading of the moveable wheel axle.

25. An industrial truck comprising:
a vehicle frame;
a load pickup, which can be displaced in relation to the vehicle frame;
a front wheel axle;
a moveable wheel axle a distance from the front wheel axle, wherein the moveable wheel axle is further away from the load pickup than the front wheel axle and is capable of moving in relation to the vehicle frame;
a selectively controllable load force device connected in terms of force transfer to the load pickup and provided so as to displace the load pickup in relation to the vehicle frame;
an adjusting device connected to the moveable wheel axle and configured to adjust the moveable wheel axle in relation to the vehicle frame along an adjustment trajectory with an adjustment component that is orthogonal with respect to a standing area of the industrial truck;
wherein a loading force, which is caused by a tare weight of the industrial truck and any load picked up by said industrial truck, acts on the moveable wheel axle, and the loading force changes while said industrial truck is in operation;
wherein an additional force, which is in addition to the loading force and is an actuating force required for adjusting the moveable wheel axle, is changed according to a force output by the load force device; and wherein the adjusting device comprises a first pressure chamber having a pressure that is changed according to the force output by the load force device such that a reduction in the loading force is compensated for by an increase of hydraulic pressure in the first pressure chamber.

26. The industrial truck as claimed in claim 25, wherein the moveable wheel axle is hydraulically spring-loaded and the pressure of the first pressure chamber is changed while retaining the spring-loading of the moveable wheel axle.

* * * * *